United States Patent [19]

Meyer

[11] 4,207,569
[45] Jun. 10, 1980

[54] RAILROAD RADIO FREQUENCY WAVEGUIDE

[76] Inventor: Jack R. Meyer, 3223 Highland La., Fairfax, Va. 22030

[21] Appl. No.: 933,508

[22] Filed: Aug. 14, 1978

Related U.S. Application Data

[63] Continuation-in-part of Ser. No. 823,093, Aug. 9, 1977, abandoned.

[51] Int. Cl.² .............................................. G01S 9/56
[52] U.S. Cl. ................... 343/6.5 R; 246/7; 246/121; 343/5 PD; 343/13 R; 375/37
[58] Field of Search ................. 246/7, 8, 120, 121, 246/122 R, 187 C; 325/51, 53; 343/5 R, 5 PD, 6.5 R, 13 R

[56] References Cited

U.S. PATENT DOCUMENTS

| | | |
|---|---|---|
| 1,517,549 | 12/1924 | Espensheid . |
| 2,380,864 | 7/1945 | Nicholson ....................... 343/5 R X |
| 2,614,209 | 10/1952 | Sorensen ................................. 246/8 |
| 2,818,732 | 1/1958 | Bennett ......................... 343/6.5 R X |
| 3,312,818 | 4/1967 | Staples . |
| 3,368,072 | 2/1968 | Baughman . |
| 3,377,587 | 4/1968 | Nakahara et al. ............. 343/5 PD X |
| 3,392,388 | 7/1968 | Nakahara et al. |
| 3,466,651 | 9/1969 | Bigelow ....................... 343/5 PD X |
| 3,739,376 | 6/1973 | Keledy . |
| 3,798,642 | 3/1974 | Augenblick et al. |
| 3,806,905 | 4/1974 | Strenglein . |
| 3,940,765 | 2/1976 | Grafinger et al. |
| 3,982,243 | 9/1976 | Gustavsson et al. |

OTHER PUBLICATIONS

Midgley et al., "Seeing Around the Bend", *Railway Engineering*, Sep./Oct. 1975, pp. 3, 5 & 10.

Ogilvy, "Radar on the Railways", *Electronics and Power*, May 1964, pp. 146-150.

Beal et al., "Continuous-Access Guided Communication (CAGC) for Ground Transportation Systems", *Proceedings of the IEEE*, May 1973, pp. 562-568.

Gallawa et al., "The Surface-Wave Transmission Line and its Use in Communicating with High-Speed Vehicles", *IEEE Transactions on Communications Technology*, Mar. 1968, pp. 518-524.

Farmer et al., "Guided Radiation", *IEEE Transactions on Vehicular Communications*, Mar. 1965, pp. 93-98.

Barlow, "High Frequency Guided Electromagnetic Waves in Application to Railway Signalling and Control", *The Radio and Electronic Engineer*, May 1967, pp. 275-281.

*Primary Examiner*—T. H. Tubbesing
*Attorney, Agent, or Firm*—Cushman, Darby & Cushman

[57] ABSTRACT

Disclosed is a waveguide for conducting radio frequency signals along a railroad line comprising the ballast, ties and rails of the railroad line. If the waveguide is utilized for intra-train communication, the wheels, axles and under-vehicle parts of the vehicles of the train comprise the side and upper surfaces of the waveguide. The waveguide may be utilized to: (1) transmit data such as train vehicle journal bearing temperatures, from remote locations to either the caboose or engine of the train; (2) guide radar-type radio frequency pulses ahead of the train; or (3) transmit any other data. In the radar embodiment, reflections received by a receiver on the train represent changes in the characteristic impedance of the waveguide. These reflections may be compared to anticipated reflections in order to detect improper conditions such as broken track or the presence of another train.

51 Claims, 5 Drawing Figures

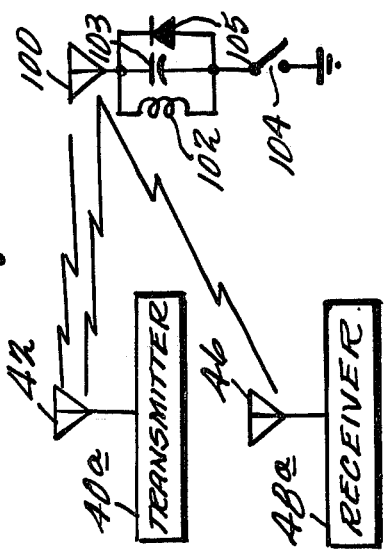
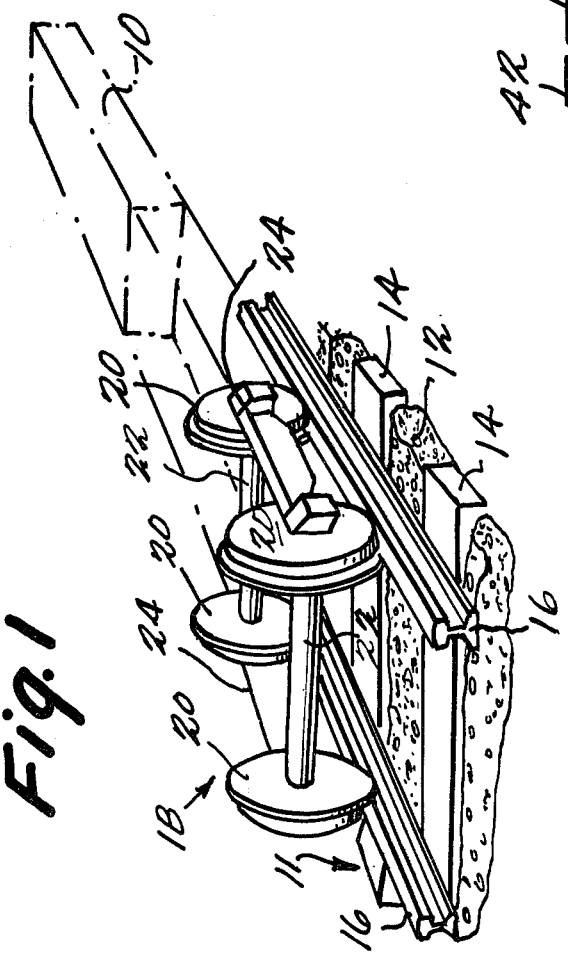
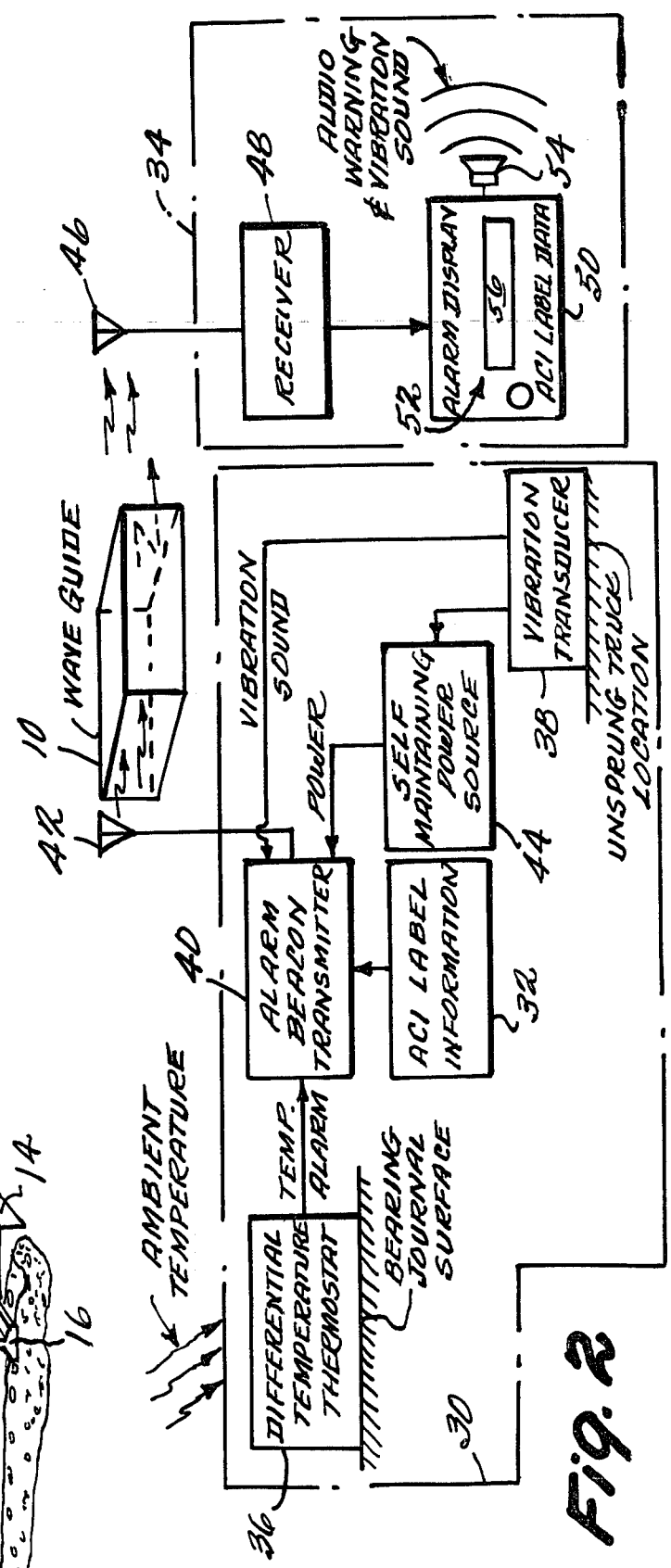

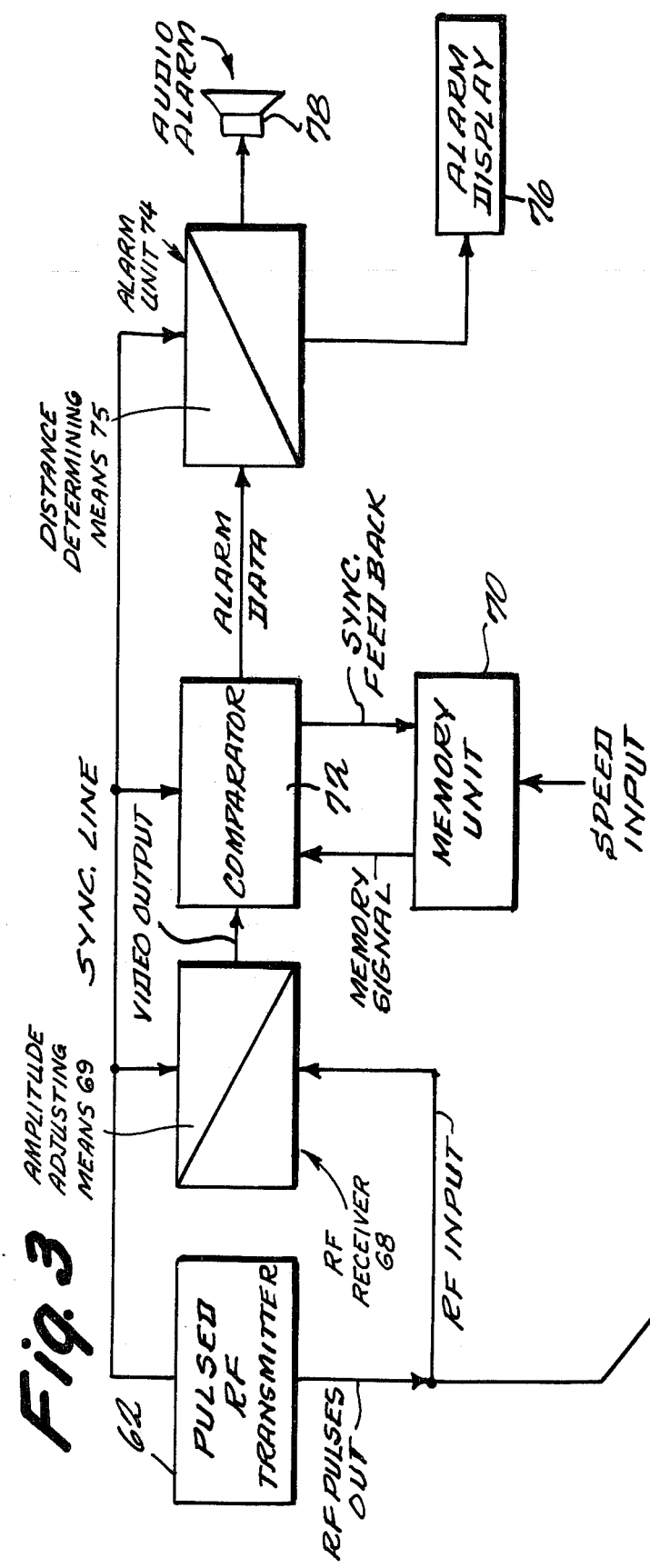
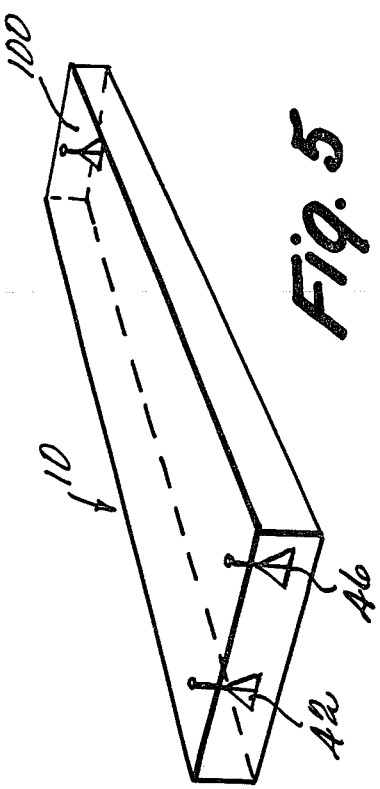
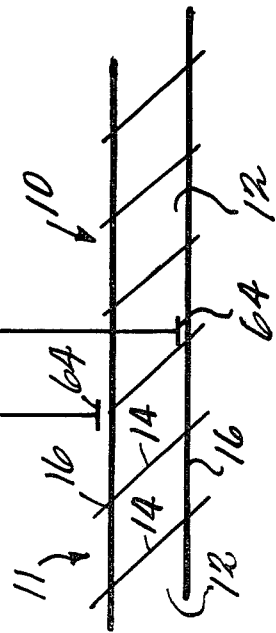

RAILROAD RADIO FREQUENCY WAVEGUIDE

The present application is a continuation-in-part of copending application Ser. No. 823,093, filed Aug. 9, 1977, now abandoned. The contents thereof are incorporated herein by reference.

The present invention relates to a method and apparatus for transferring data by means of radio frequency signals along a railroad line.

One of the major stumbling blocks encountered in recent attempts to modernize railroad technology is the creation or provision of data transfer channels along a railroad line. The data transfer method utilized should minimize possible interference with other railway electronic systems. It should also minimize possible interference caused by either signals from trains on other tracks, or other possible signal sources. Thus it appears that any data transfer channel should be confined, as much as possible, to the physical envelope of the railway line.

The need for a data transfer channel arises in at least two railway applications: (1) intra-train communications, particularly, the remote sensing of train parameters, and (2) detection of track condition. The first application relates to data transfer within the physical envelope of the train, while the second relates to data transfer in the physical envelope of the railroad line ahead of the train.

The remote sensing of train parameters could detect, for example, overheated train vehicle journal bearings and excessive vehicle truck vibration. Overheated journal bearings, together with the resulting bearing distress, journal fracture, and, occasionally, derailments have long been a problem in the railroad industry. Other mechanical malfunctions, that are associated with the trucks and are often more difficult to detect than overheated bearings, give rise to the need for a method of detecting various types of equipment malfunctions before they become serious.

For example, in 1974 there were 35 million freight-car miles of operation. During this time there were 15,561 setouts due to overheated journal boxes and a total of 1,100 heat-broken bearing journals. Statistics further indicate that 323 (29%) of these heat-broken journals resulted in derailments. During that year there wer 1,973 derailments so that overheated journal boxes led to 16% of these derailments. It is further estimated that these 323 derailments, due to overheated journal bearings, cost 5.8 million dollars. This does not include added cost caused by delay of schedules, rerouting trains and other economic losses associated with derailment.

A number of approaches have been utilized to detect overheated journal bearings. In the most prominently utilized method, heat-sensing devices are positioned at trackside of measuring the temperature of each journal bearing as it passes the sensor. There are many problems with this method of detection. One major railroad reports 50–60% false train stops with the presently utilized infrared detectors. These false alarms resulted from hot brake shoes, hot wheels, reflected sunlight or steam leaks on passenger equipment. Another problem involves the difficulty of differentiating between solid journal bearings, which typically have a 20°–25° F. journal temperature rise above the ambient, and the roller journal bearing which typically has a 100° F. journal temperature rise above the ambient. This temperature detection technique is further complicated by dirty undercarriage conditions, the previous history of the train such as speed, braking, length of time over which the bearing have had a chance to heat, and snow or ice on the journal boxes.

In an alternative approach to this problem, each train carries detectors so that immediate indications are supplied to the screw that an overheating condition is developing. The use of a "hard wire" system to connect temperature sensors on the various vehicles in the train to a monitor in the engine cab or caboose may be practical for passenger car usage. However it is not compatible with freight operations where the vehicles comprising a train are frequently changed and where many of the vehicles which are introduced into the train may not be equipped with the appropriate detection equipment. Also, the labor cost associated with making, breaking and inspecting such electrical connections in addition to the mechanical and air-brake connections, which would make this type of system prohibitively expensive.

Thus, a practical on-board overheated journal detection device cannot include hard-wire connections through the entire train. It should also be totally compatible with all mixes of equipment, whether or not all vehicles of the train are equipped with the detection equipment. Thus, the major problem with developing a system meeting the above criteria is developing a channel over which communications may be transferred.

Recent derailments and the resulting loss of both life and physical property have added concern to the overall safety of rail transportation, especially in the area of preventing catastrophic accidents caused by broken rails, open switches, debris on the tracks and other track conditions which are not detectable by the train crew in time to prevent an accident. Many of these malfunctions of the trackage are not readily detectable by the present block signal systems. Accordingly, a need exists for a method of enabling a train to receive indications of adverse track conditions beyond the line of sight early enough to enable the train to stop before physically encountering the conditions.

Radar has been proposed to detect track conditions. However, there are a number of problems with free space radar systems as presently being used in air transportation. Such radar would interfere with similar systems on adjacent tracks. In addition, free space radar would not follow bends in the track or changes in grade.

Thus, again, the major stumbling block in establishing a track condition detection system is a channel for conducting the radar data. The requirements for a data transfer channel in either the intra-train communication system or the track detection system is similar. Interference with other railroad electronic systems, and other railroad lines should be minimized.

Radio frequency waveguides have been proposed as the appropriate channel for railroad data transfer. For example, the following documents discuss the use of radio frequency microwave radiation, directed by waveguides, for use in either a radar or communication system: "Seeing Around the Bend" by Midgley et al., *Railway Engineering* (September/October 1975); "Radar on the Railways" by Ogilvy, *Electronics and Power* (May 1964); "Continuous-Access Guided Communication (CAGC) for Ground-Transportation Systems" by Beal et al., *Proceedings of the IEEE* (May 1973); "The Surface-Wave Transmission Line and Its Use in Communicating with High-Speed Vehicles" by Gallawa et al., *IEEE Transactions on Communication Technology*, Vol. Com-17, No. 5 (October 1969); "Guided Radiation" by Farmer et al., *IEEE Transactions on Vehicular Communications* (March 1965); U.S. Pat. No. 3,392,388 to Nakahara et al.; and "High Frequency Guided Electromagnetic Waves in Application to Railway Signalling and Control" by Barlow, *The Radio and Electronic Engineer* (May 1967). However, the waveguides proposed in the above-cited documents require additional equipment which must be constructed continuously along every mile of railroad track where such a data transfer channel is desired. This is an extremely expensive proposition and would take an undesirably long time to complete.

Several U.S. patents propose the use of the rails themselves as the channel U.S. Pat. Nos.: 1,517,549 to Espenschied; 3,312,818 to Staples; and 3,368,072 to Baughman. The Baughman and Staples patents teach a remote speed control system. Espenschied teaches a railway signaling system, and more particularly, a track condition detection system.

In Espenschied, relatively low frequency signals are directed within track rails constituting conductors. The signals will be reflected at discontinuities, particularly, an open circuit (caused by a break in the rail) or a short circuit (caused by the wheels and axles of another train).

In track condition detection systems, utilization of the rails as conductors produces inferior results to radar systems in that only open or shorted track conditions may be detected. Objects not bridging the tracks or non-conducitng objects on the tracks, such as rocks from a rock slide, will remain undetected. Furthermore, it is necessary to utilize fairly low frequency signals since the attenuation per unit distance of the rails increases as the frequency increases. However, utilization of low frequencies, and therefore long wavelengths, in a track condition detection system results in poor resolution.

The attenuation of a rail conducted signal is fairly high, since the DC resistance between rails is 1 to 10 ohms for every 1000 feet of track. Also, electromagnetic noise will be readily conducted by the rails.

The problems inherent with the prior art are overcome by the present invention which utilizes the rails and means supporting the rails such as ballast and ties of the railroad line as a waveguide/transmission line for conducting data. In the intra-train communication embodiment of the present invention, the wheels, axles, and under-vehicle parts of the train are also utilized as the side and top surfaces of the waveguide.

In the intra-train communication system wherein information concerning the temperature of the vehicle journal bearings and vibration level of the vehicle trucks are being monitored, temperature detectors and vibration transducers are employed to actuate transmitters associated with the vehicles comprising the train. When a predetermined temperature or vibration level is exceeded, the transmitter sends a radio frequency signal through the waveguide comprising the railroad bed and under-vehicle parts of the train to a receiver located in either the engine or caboose. The receiver translates the radio frequency signals to an alarm signal. This communication system may also be utilized to transmit voice, video or any other type of signals. The system may also be utilized to communicate between a train and trackside locations.

In the track condition detection system embodiment of the present invention, a transmitter directs pulsed radio frequency signals along the bed of the railroad ahead of the train.

Any change in the spacing of the rails or of the makeup of the dielectric material between or around the rails will cause a change in the characteristic impedance of the transmission line and thus will cause a reflection of radio frequency signals which are transmitted down the bed. The magnitude of the reflection will depend primarily on the magnitude of the change in the characteristic impedance. Obviously, existing grade crossings, switches, crossovers and insulated joints, etc., will also cause reflections. However, the reflections from these track elements can be readily identified by making a trial run over the trackage and recording the reflections. These known reflections then become a standard against which all future reflection indications will be compared on a real time basis. The absence of an anticipated reflection or the presence of a new reflection indicates to the train operator that something has changed in the physical makeup of the trackage since the time that the standard reflections were recorded. This comparison can be done within a time frame that will allow the engineer to slow or stop his train prior to encountering the location that contains the charged reflection indication. This will allow slowing down to make a visual inspection in order to prevent encountering the adverse condition at a higher rate of speed and thus risking a derailment or other forms of accidents. A waveguide comprising the rails, and means for supporting the rails such as the ties and ballast of the track guide both the transmitted pulses and the reflections.

Means are also provided for adjusting the playback speed of the recorded reflections with the train speed. In addition, a synchronizing error signal, indicative of the difference between the received reflections and the recorded reflections, is utilized to increment the speed of playback so as to minimize the error signal. This feedback alleviates any inaccuracies inherent in train speedometer systems.

Thus the waveguide of the present invention permits both intra-train communication without the necessity of direct linkage between the vehicles of the train, and track condition detection with high resolution and without the need of a separate or additional waveguide structure along the railroad line. In both embodiments the radio frequency signals are guided around curves and over hills, thus eliminating line of sight problems that might otherwise occur. These and other objects of the invention will become more apparnet and more readily appreciated from the following detailed description of the presently preferred exemplary embodiments of the invention taken in conjunction with the accompanying drawings, of which:

FIG. 1 is a schematic illustration of the waveguide of the present invention;

FIG. 2 is a schematic illustration of the intra-train communication system embodiment of the present invention;

FIG. 3 is a schematic representation of the track condition detection system embodiment of the present invention;

FIG. 4 is a schematic illustration of a passive sensing embodiment of the present invention; and FIG. 5 is a schematic illustration of the placement of antennas in the waveguide in the embodiment illustrated in FIG. 4.

Referring now to the basic waveguide structure 10 illustrated in FIG. 1, the typical existing railroad track structure 11 consists of rails 16 and means for supporting rails 16 such as ballast 12 and ties 14 embedded in ballast 12. Since the typical DC resistance between the rails for every 1000 feet of track is 1 to 10 ohms (significantly less than the impedance between similar length of rails suspended in free space) this structure alone acts to guide radio frequency signals along the road bed. FIG. 1 additionally shows the typical structure of a railroad vehicle truck assembly 18 comprising wheels 20, axles 22 and interconnecting members 24. Road bed 11 and truck assembly 18, together with the other under-vehicle parts of the train (not shown), may also form waveguide 10 useful in intra-train communications. Ballast 12 and ties 14 form the lower surface of waveguide 10, rails 16, wheels 20 and interconnecting members 24 form the sides of waveguide 10, and axles 22 and the under-vehicle parts of the train form the top surface of waveguide 10.

The distance between the rails of a vast majority of the railroad lines in this country is 4 feet, 8½ inches. In order for a radio frequency signal to propagate down the waveguide as desired, it is necessary that the distance between the rails be at least a half wavelength. If the radio frequency signal is to have a half wavelength less than or equal to 4 feet, 8½ inches, the frequency of the signal must be at least 110 megahertz. In the preferred embodiment, a frequency of 160 megahertz is utilized.

FIG. 2 illustrates an intra-train communication system utilizing waveguide 10 comprising road bed 11 and train vehicle trucks 18. The system is comprised of three basic elements. The first element, alarm beacon 30, attached to each truck 18 transmits a signal along waveguide 10, the second element, to the third element, alarm receiver 34, which signal represents the condition of the truck to which alarm beacon 30 is attached. Alarm receiver 34 may be located anywhere along the train, for example, either in the caboose or the engine.

Alarm beacon 30 includes differential temperature sensing means 36 which may be any temperature transducer which compares the ambient temperature to the temperature of a particular surface. In this case, temperature sensing means 36 is attached to the bearing journal surface. When the temperature differential exceeds a predetermined amount, a temperature alarm signal is produced.

Vibration sensing means 38, positioned on an unsprung portion of each vehicle truck, produces a signal related to the vibration level of the truck. Transmitter 40 will be activated by either the temperature alarm signal or an excessively large vibration signal. Upon activation of transmitter 40, the ACI label data for the car from storage means 32 will be transmitted by antenna 42.

In the most elementary embodiment of the present invention, transmitter 40 will send a signal that merely indicates an excessive vibration or an over temperature condition. In more complex embodiments of the invention, a more complex signal is sent, which signal identifies the degree of over temperature or vibration and may also transmit the actual vibration sound to permit the train crew to identify the source of vibration.

Power supply 44 drives transmitter 40. The power supply is self-maintaining so as to eliminate the need for battery replacements on a scheduled basis or after each alarm, as is the case of some currently proposed devices. The power supply used vibration sensing means 38 to convert a small part of the normal vibration found in the unsprung truck parts into usable electrical energy. This may be accomplished in the same way that a microphone converts sound waves into electrical energy. The electrical energy so produced is used to trickle charge or recharge, a small battery. Thus the power supply battery will always be fully charged whenever the train is moving and generating vibrations.

Alarm receiver 34 receives radio frequency signals by means of antenna 46 which signals are converted to an alarm signal by means of receiver 48. Alarm receiver 34 will receive signals from any of the alarm beacons that have detected a fault condition. Display means 50 includes visual alarm indicator 52 and audio alarm indicator 54. The ACI label information received by receiver 48 may be displayed by readout means 56 to indicate the particular vehicle wherein the fault condition is located. In addition, a digital readout panel may be provided which indicates the actual temperature of the faulty journal bearing or other details related to the detected fault. This would provide a greater degree of protection for the vehicles and allow the train crews some latitude in selecting a course of action at the expense of increasing the unit cost and complexity. Audio display device 54 may also be used to project the actual vibration sound to provide the train crew with further information.

Alternatively, a passive remote sensing system may be employed as illustrated in FIGS. 4 and 5. Transmitter 40a and receiver 48a may be positioned at the same location. Transmitter 40a produces either a continuous or intermittent signal which is conducted by waveguide 10. Positioned on each vehicle truck 18 is a temperature sensing means 104 connected to a radio frequency transponder comprised of a ringing circuit including inductor 102, capacitor 103, and a harmonic generator in the form of diode 105 and antenna 100. Upon detection of a fault condition, sensing means 104 completes the ringing circuit, enabling the transponder to resonate. Upon detection of a fault, the transponder receives the energy carried by the signal from transmitter 40a and then re-radiates this energy by means of antenna 100 at the fundamental or a harmonic frequency back along waveguide 10. This re-radiated signal is received by alarm receiver 48a and an alarm is actuated. Passive remote indicating systems are disclosed in U.S. Pat. No. 3,798,642 to Augenblick et al.; U.S. Pat. No. 3,806,905 to Strenglein; U.S. Pat. No. 3,739,376 to Keledy; U.S. Pat. No. 3,940,765 to Grafinger et al.; and U.S. Pat. No. 3,982,243 to Gustavsson et al.

Waveguide 10 may also transmit other types of data such as voice or video signals. The waveguide may also be utilized for communication between the train and the trackside locations.

FIG. 3 illustrates a track condition detecting system embodiment of the present invention. This system may be utilized to detect any discontinuity in rails 16 which may be caused by either switches, grade-crossings, bridges or other standard railroad components, or which may be caused by a broken rail, an open switch, debris on the track or other adverse conditions. In many cases, the speed of a train and its physical location with respect to potential adverse conditions will not allow the operator to stop, after a visual sighting in time to avoid physically encountering the adverse condition, thereby leading to a derailment or other type of rail accident.

In this embodiment, transmitter 62 produces pulses of radio frequency signals. These pulses are applied through coupling devices 64 to waveguide 10 comprising rails 16 and means supporting rails 16 such as ties 14 and ballast 12. This waveguide confines the radio frequency energy to the physical envelope of the track.

Radio frequency receiver 68 receives through coupling devices 64 reflections of the pulses produced by transmitter 62. Receiver 68 includes sensitivity-time controls or means for adjusting amplitude 69 to change the gain of received signals with time, so as to compensate with respect to time for the increased distance traveled by (and therefore attenuation of) the signal. Therefore, the amplitude of the received reflected signal will be adjusted within receiver 68 so that the output of receiver 68 is normalized to eliminate the change in amplitude caused by the distance between coupling devices 64 and any change in characteristic impedance along the railroad line which produced the reflection. Memory unit 70, which may be a tape recorder, stores a signal representative of the anticipated reflections from the particular section of track. This signal may have been recorded in a previous run over the track. Memory unit 70 is advanced as the train proceeds along the track in relation to the speed of the train. Comparator 72 receives the video output signal and memory signal and compares the amplitudes of the two signals. This error signal is used for two purposes. First, the error signal is fed back to memory unit 70 and utilized to adjust the speed of memory unit 70 so as to minimize the error signal. Such error signal feedback systems for synchronizing two signals are well known in the art.

In addition, the error signal is applied to alarm unit 74. If the error signal exceeds a predetermined amplitude, indicative of a significant difference between the received reflection and the stored or anticipated reflection, alarm unit 74 is activiated to produce a visual display on display means 76 and an audio alarm by means of speaker 78.

Transmitter 62 produces a synchronization pulse with each microwave pulse. The synchronization pulse is applied to receiver 68, comparator 72 and alarm unit 74. The synchronization pulse is utilized in receiver 68 to reset the sensitivity-time controls therein. Alarm unit 74 includes means for determining distance 75 which counts the time between the synchronization pulse and an alarm signal received as a result of the radio frequency pulses associated with the synchronization pulse. Thus, distance determining means 75 of alarm unit 74 counts the time from the transmission of a radio frequency pulse to the time an improper reflection is received or the time a reflection should have been received. This time is proportional to the distance between the train and the obstruction causing the improper reflection. Thus, not only will the existence of a track obstruction be detected, but the distance to that obstruction may be displayed on display means 76.

In operation, transmitter 62 simultaneously produces a pulse of radio frequency radiation and a synchronization pulse. The radio frequency pulse is transmitted along waveguide 10 comprising rails 16 and means for supporting rails 16 such as ties 14 and ballast 12. Upon receipt of the synchronization pulse, receiver 68 initializes its sensitivity-time controls so that the gain of receiver 68 increases with time to compensate for attenuation along waveguide 10. Also the synchronization pulse causes a counter in alarm unit 74 to reset and begin responding to clock pulses. Changes in the track will cause reflections to be directed back toward the train. Some of these reflections will be caused by grade-crossings, switches, crossovers and insulated joints, etc. However, other of these reflections may be caused by broken rails, open switches, debris on the track or other track malfunctions. An abrupt change of track gauge of one inch will reflect approximately 0.3% of the radio frequency energy arriving at the break. These reflections are received by receiver 68 and a signal representing the same is applied to comparator 72. Simultaneously, memory unit 70 provides comparator 72 with a signal representing the anticipated reflections which should be received over the particular section of track. An error signal is generated by comparator 72 which represents the difference in amplitude between the received reflection signal and the stored or anticipated reflection signal. This signal is applied to memory unit 70 to adjust its speed so as to minimize the error signal and is also applied to alarm unit 74. When the error signal exceeds a certain amplitude, an alarm signal is produced within alarm unit 74 which actuates display means 76 and speaker 78. The alarm signal also halts the counter within alarm unit 74, which counter contains the representation of a number related to the distance between the train and the obstruction causing the alarm signal. This distance may be displayed on display means 76.

As discussed above, the preferred embodiment operates at a frequency of 160 megahertz. At this frequency, each cycle of the radio frequency pulse is approximately 50 feet in length, thus providing resolution on the order of 25 to 50 feet.

Display means 76 may also provide for the visual display of signals representing the received reflections and the stored or anticipated reflections by using an oscilloscope-type display. This may provide an indication of the type of obstruction which the train is approaching.

Although only a few exemplary embodiments of this invention have been described in detail above, those skilled in the art will readily appreciate that many modifications are possible in the exemplary embodiments without materially departing from the novel teachings and advantages of this invention. For example, other structure for supporting rails 16, such as cement and means for connecting rails 16 to the cement, may be a portion of waveguide 10 within the scope of this invention. Also a monorail structure including the rail, means for connecting vehicles to the rail and rail support means may form a waveguide within the scope of the invention.

Accordingly, all such modifications are intended to be including within the scope of this invention as defined in the following claims.

What is claimed is:

1. In combination:
    a system for transferring data along a railroad line comprising a waveguide, radio frequency transmitter and radio frequency receiver, said waveguide comprising:
    at least one rail of said railroad line; and means for supporting said rail.

2. A combination as in claim 1 wherein said waveguide further comprises a plurality of wheels, axles and under-vehicle parts of the vehicles comprising a train supported by said at least one rail.

3. A combination as in claim 1 wherein:
    said combination is utilized for intra-train communication; and
    said waveguide further comprises a plurality of railroad vehicle wheels, axles and under-vehicle parts.

4. A combination as in claim 3 wherein said combination further comprises passive condition sensing means for receiving radio frequency signals and re-radiating a radio frequency signal upon the occurrence of a predetermined condition in at least one part of said vehicles.

5. In a system for transferring data by means of radio frequency signals along a railroad line comprising at least one rail of said railroad line and means for supporting said at least one rail, said system comprising a waveguide, means for transmitting radio frequency signals containing said data along said waveguide and means for receiving said radio frequency signals, the improvement wherein said waveguide is comprised of said supporting means and said at least one rail.

6. A system as in claim 5 wherein:
said means for transmitting comprising means for transmitting radio frequency pulses; and
said means for receiving comprising means for receiving the reflection of said radio frequency pulses, said waveguide conducting said radio frequency pulses and reflections of said radio frequency pulses, said data transferred representing railroad track conditions.

7. A system as claim 5 further comprising a railroad train, said transmitting and receiving means being disposed on said train at different locations.

8. A system as in claim 7, wherein said system further comprises passive sensing means for receiving said radio frequency signals and re-radiating a radio frequency signal, said means for receiving being responsive to said re-radiated radio frequency signals.

9. In a system as in claim 5 further comprising a train of vehicles supported by said at least one rail said waveguide further comprising a plurality of wheels, axles and under-vehicle parts of said vehicles.

10. Apparatus for transferring data along a railroad line comprising:
means for transmitting radio frequency signals containing said data;
means for conducting said radio frequency signals along said railroad line, said means for conducting comprising at least one rail of said railroad line and means for supporting said at least one rail; and
means for receiving said signals.

11. Apparatus as in claim 10 wherein said means for conducting further comprises a plurality of wheels, axles and under-vehicle parts of the vehicles comprising a train supported by said tracks.

12. Apparatus as in claim 10 wherein:
said means for transmitting comprising means for transmitting radio frequency pulses;
said means for receiving comprising means for receiving said refelctions, said waveguide conducting said radio frequency pulses and reflections of said radio frequency pulses, said data transferred representing the condition of the track of said railroad.

13. Apparatus for tranferring data along a railroad line comprising:
a waveguide comprising the ballast of said railroad line, a plurality of ties embedded in said ballast and at least one rail attached to said ties;
means for transmitting radio frequency signals containing said data along said waveguide; and
means for receiving said signals.

14. Apparatus as in claim 13 wherein:
said data transferred is intra-train communications; and
said waveguide further comprises a plurality of railroad vehicle wheels, axles and under-vehicle parts, said ballast and teis forming the lower surface of said waveguide, said at least one rail and wheels forming the side surfaces of said waveguide; and said axles and under-vehicle parts forming the upper surface of said waveguide.

15. Apparatus as in claim 14 further comprising passive condition sensing means for receiving said radio frequency signal and re-radiating a radio frequency signal when a predetermined condition is detected, said means for receiving being responsive to said re-radiated radio frequency signal.

16. A method of transferring data along a railroad line comprising the steps of:
transmitting radio frequency signals containing said data along a waveguide comprising at least one rail of said railroad line and means for supporting said at least one rail; and
receiving said radio frequency signals.

17. A method as in claim 16 wherein:
said data transferred represents the condition of the track of said railroad;
said transmitting step transmits radio frequency pulses; and
said receiving step receives the reflections of said radio frequency pulses.

18. A method of transferring data along a railroad line comprising the steps of:
transmitting radio frequency signals containing said data along a waveguide comprising at least one rail of said railroad line, means for supporting said at least one rail, and a plurality of wheels, axles and under-vehicle parts of the vehicles comprising a train supported by said rails; and
receiving said radio frequency signals.

19. A method as in claim 18 wherein said transmitting and receiving steps occur at different locations on said train.

20. A method as in claim 19 further comprising the step of absorbing said radio frequency signals and re-radiating a radio frequency signal upon the occurrence of a predetermined condition in at least one part of one of said vehicles, said receiving step including the step of receiving said re-radiated radio frequency signal.

21. In a system for railroad intra-train communication by means of radio frequency signals comprising a waveguide, means for transmitting radio frequency signals containing said communication along said waveguide and means for receiving said radio frequency signals, the improvement wherein said waveguide is comprised of:
at least one rail supporting said train;
a plurality of ties supporting said at least one rail;
ballast supporting said ties, said ballast and ties forming the bottom surface of said waveguide;
a plurality of wheels of said train, said at least one rail and wheels forming the side surfaces of said waveguide; and
a plurality of axles and under-vehicle parts of said train forming the upper surface of said waveguide.

22. Apparatus for railroad intra-train communication comprising:
a waveguide comprising at least one rail supporting said train, a plurality of ties supporting said at least one rail and ballast supporting said ties, a plurality of wheels of said train, and a plurality of axles and under-vehicle parts of said train;

means for transmitting radio frequency signals containing said communication along said waveguide; and means for receiving said signals.

23. Apparatus as in claim 27 wherein:

said apparatus further comprises passive condition sensing means for detecting a predetermined level of at least one of temperature and vibration in at least one of the parts of the vehicles of said train, said passive sensing means receiving said radio frequency signals and re-radiating a radio frequency signal upon the occurrence of said predetermined level; and said means for receiving is responsive to said re-radiated signal.

24. A method of railroad intra-train communication comprising the steps of:

transmitting radio frequency signals containing said communication along a waveguide comprising at least two rails supporting said train, a plurality of ties supporting said rails and ballast supporting said ties, a plurality of wheels of said train, and a plurality of axles and under-vehicle parts of said train, said ballast and ties forming the lower surface of said waveguide, said rails and wheels forming the side surfaces of said waveguide and said axles and under-vehicle parts forming the upper surface of said waveguide; and receiving said radio frequency signals.

25. A method as in claim 24 further comprising the steps of:

detecting a predetermined level of at least one of temperature and vibration in at least one of a plurality of parts of the vehicles of said train to which passive condition sensing means is attached; and absorbing said radio frequency signals and reradiating a radio frequency signal upon the occurrence of said predetermined condition, said receiving step being responsive to said re-radiated radio frequency signal.

26. Apparatus for collecting data concerning the conditions of vehicles comprising a railroad train, said apparatus comprising:

at least one condition sensing means attached to at least one part of said vehicles;

at least one radio frequency transmitter, one transmitter associated with at least one of said sensors and each of said sensing means associated with one of said transmitters;

waveguide means comprising at least one rail of said railroad, means for supporting said at least one rail, a plurality of wheels of said train, and a plurality of axles and under-vehicle parts of said train said waveguide means for conducting the radio frequency output of said at least one transmitter; and means for receiving said radio frequency output.

27. Apparatus as in claim 26 wherein:

said condition sensing means detects a predetermined level of at least one of temperature and vibration of at least one of the parts of said vehicles; and said apparatus further comprises means for producing an alarm signal representing the occurrence of said predetermined level.

28. Apparatus for collecting data concerning the conditions of the vehicles comprising a railroad train, said vehicles comprising a plurality of parts, said apparatus comprising:

sensing means attached to at least one of said parts for detecting at least one of the temperature and vibration levels of said at least one of said parts;

means for transmitting radio frequency signals representing said conditions when said conditions exceed a predetermined value;

waveguide means comprising the ballast of said railroad line, a plurality of ties embedded in said ballast, at least one rail attached to said ties, a plurality of wheels of said train and the plurality of axles and under-vehicle parts of said train, said waveguide means for guiding said radio frequency signals along said railroad;

means for receiving said signals; and means for producing an alarm signal from said received radio frequency signals, said alarm signal indicative of at least one of said sensing means detecting a condition exceeding said predetermined value.

29. Apparatus as in either of claims 26 or 28 wherein said sensing means further comprises means for determining the difference between the ambient environmental temperature and the temperature of said at least one part.

30. Apparatus as in either claim 26 or 28 wherein:

said conditions are at least one of temperature and vibration level of said at least one part; and said apparatus further comprises means for displaying the actual said at least one of temperature and vibration level of said at least one part.

31. A method of collecting data concerning the conditions of vehicles comprising a railroad train, said method comprising the steps of:

detecting at least one condition of at least one part of said vehicles;

transmitting radio frequency signals indicative of a predetermined condition along waveguide means comprising least one rail of said railroad, means for supporting said at least one rail, a plurality of wheels of said train, and a plurality of axles and under-vehicle parts of said train, supporting means forming the lower surface, said at least one rail and wheels forming the side surfaces, and said axles and under-vehicle parts forming the upper surface of said waveguide means; and receiving said radio frequency signals.

32. A method as in claim 31 wherein:

said detecting step detects a predetermined level of at least one of temperature and vibration of said at least one part; and said method further comprises the step of producing an alarm signal upon receipt of a radio frequency signal representing the occurrence of said predetermined level.

33. A method of collecting data concerning the conditions of vehicles comprising a railroad train, said method comprising the steps of:

detecting at least one of temperature and vibration level of at least one part of said vehicle;

transmitting radio frequency signals related to said conditions when said conditions exceed a predetermined level, said transmitting step transmitting said signals along waveguide means comprising the ballast of said railroad, a plurality of ties embedded in said ballast, at least two rails attached to said ties, a plurality of wheels of said train, and a plurality of axles and under-vehicle parts of said train;

receiving said radio frequency signals; and producing an alarm signal from said received radio frequency signals.

34. A method as in either claim 31 or 33 wherein said detecting step senses the temperature differential between the ambient environmental temperature and the temperature of said at least one part.

35. A method as in either claim 31 or 33 wherein:
said conditions are at least one of the temperature and vibration level of said at least one part; and
said method further comprises the step of displaying the actual said at least one of the temperature and vibration level of said at least one part.

36. In a system for detecting railroad track conditions by means of radio frequency radar, said system comprising a waveguide for guiding radio frequency radar pulses, means for transmitting said radio frequency radar pulses along said waveguide and means for receiving the reflection of said radio frequency pulses, the improvement wherein said waveguide is comprised of at least one rail of said track and means for supporting said at least one rail.

37. Apparatus for detecting railroad track conditions comprising:
means for transmitting radio frequency pulses;
waveguide means for guiding said radio frequency pulses along said track, said waveguide comprising at least one rail of said track and means for supporting said rail; and
means for receiving the reflections of said radio frequencies pulses.

, 38. Apparatus as in claim 37 wherein:
said receiving means comprising means for producing a first signal related to the received reflections; and
said apparatus further includes means for generating a second signal related to anticipated reflections of said radio frequency pulses along said track, means for comparing said first signal and said second signal in order to determine track condition.

39. Apparatus as in either claim 22 or 37 further comprising power supply means for supplying power to said apparatus, said power supply means converting to electrical energy and storing a portion of the vibrational energy of said train.

40. Apparatus for detecting railroad track conditions comprising:
means for transmitting radio frequency pulses;
waveguide means comprising the ballast of said track, a plurality of ties embedded in said ballast and at least one rail attached to said ties, said waveguide means for guiding said radio frequency pulses along said track;
means for receiving the reflections of said radio frequency pulses and producing a signal related to said reflections;
means for producing a signal related to anticipated reflections of said radio frequency pulses along said track; and
means for comparing said signal representing said received reflections and said signal representing said anticipated reflections to determine track conditions.

41. Apparatus as in claim 40 wherein said means for comparing comprises means for comparing the amplitudes of said signal related to anticipated reflections and said signal related to the received reflections.

42. Apparatus as in claim 41 further comprising means for adjusting the amplitude of said signal related to said received reflection with respect to time to compensate for the attenuation of said radio frequency pulses and said reflections so as to normalize said received reflection related signal.

43. Apparatus as in claim 40 further comprising means for determining the distance between a train on said track and the point on said track causing a variation between said signals related to the anticipated and received reflections.

44. Apparatus for detecting track conditions comprising:
waveguide means comprising at least one rail of said track and means for supporting said at least one rail;
means for transmitting radio frequency pulses along said waveguide means;
means for receiving reflections of said radio frequency pulses and producing a first signal related to said reflections;
means for adjusting the amplitude of said first signal with respect to time to compensate for the attenuation of said radio frequency pulses and said reflections so as to normalize said first signal;
means for recreating a second signal related to the anticipated reflections along said track;
means for comparing the amplitude of said normalized first signal with said second signal;
means for producing an alarm signal when the amplitude of said normalized first signal differs from the amplitude of said second signal by a predetermined amount; and
means for determining the distance between said train and said point on the track causing an alarm signal to be produced.

45. A method of detecting railroad track conditions comprising the steps of:
transmitting radio frequency pulses along the rail bed of said track, said bed comprising at least one rail and means for supporting said at least one rail, said supporting means and said at least one ral cooperating to form waveguide means for guiding said radio frequency pulses; and
receiving the reflections of said radio frequency pulses.

46. A method as in claim 45 further comprising the steps of:
predetermining the proper reflections to be received along said track; and
comparing said predetermined reflections with the received reflections in order to determine track conditions.

47. A method of detecting railroad track conditions comprising the steps of:
transmitting radio frequency pulses along the bed of said track, said bed comprising ballast, a plurality of ties embedded in said ballast and at least one rail attached to said ties, wherein said ballast, ties and at least one rail cooperate to form a waveguide;
receiving the reflections of said radio frequency pulses;
predetermining the proper reflections of said radio frequency pulses to be received along said track; and
comparing said received reflections with said predetermined reflections in order to detect track conditions.

48. A method as in claim 47 wherein said comparing step comprises the step of comparing the amplitudes of signals related to the predetermined reflections and the received reflections.

49. A method as in claim 48 further comprising the step of adjusting the amplitude of said signal related to said received reflections with respect to time to compensate for the attenuation of said radio frequency pulses and said reflections so as to normalize said received reflection related signal.

50. A method as in claim 47 further comprising the step of determining the distance between the train and the point of the track causing a variation between the predetermined reflections and the received reflections.

51. A method of detecting track conditions comprising the steps of:

transmitting radio frequency pulses along the bed of said track, said bed comprising at least one rail and means for supporting said at least one rail, said supporting means and said at least one rail cooperating to form waveguide means;

receiving reflections of said radio frequency pulses and producing a first signal related to said reflections;

adjusting the amplitude of said first signal with respect to time to compensate for the attenuation of said radio frequency pulses and said reflections so as to normalize said first signal;

predetermining the proper reflections to be received along said track and recreating a second signal related thereto;

comparing the amplitude of said normalized first signal with the amplitude of said second signal;

producing an alarm signal when the amplitude of said normalized first signal differs to a predetermined degree from the amplitude of said second signal; and determining the distance between a train on said track and the point on said track causing an alarm signal to be produced.

* * * * *